April 14, 1959  R. C. WEBSTER  2,882,494
ELECTRICAL GROUND AND CONTINUITY CONTROL
Filed Feb. 23, 1954
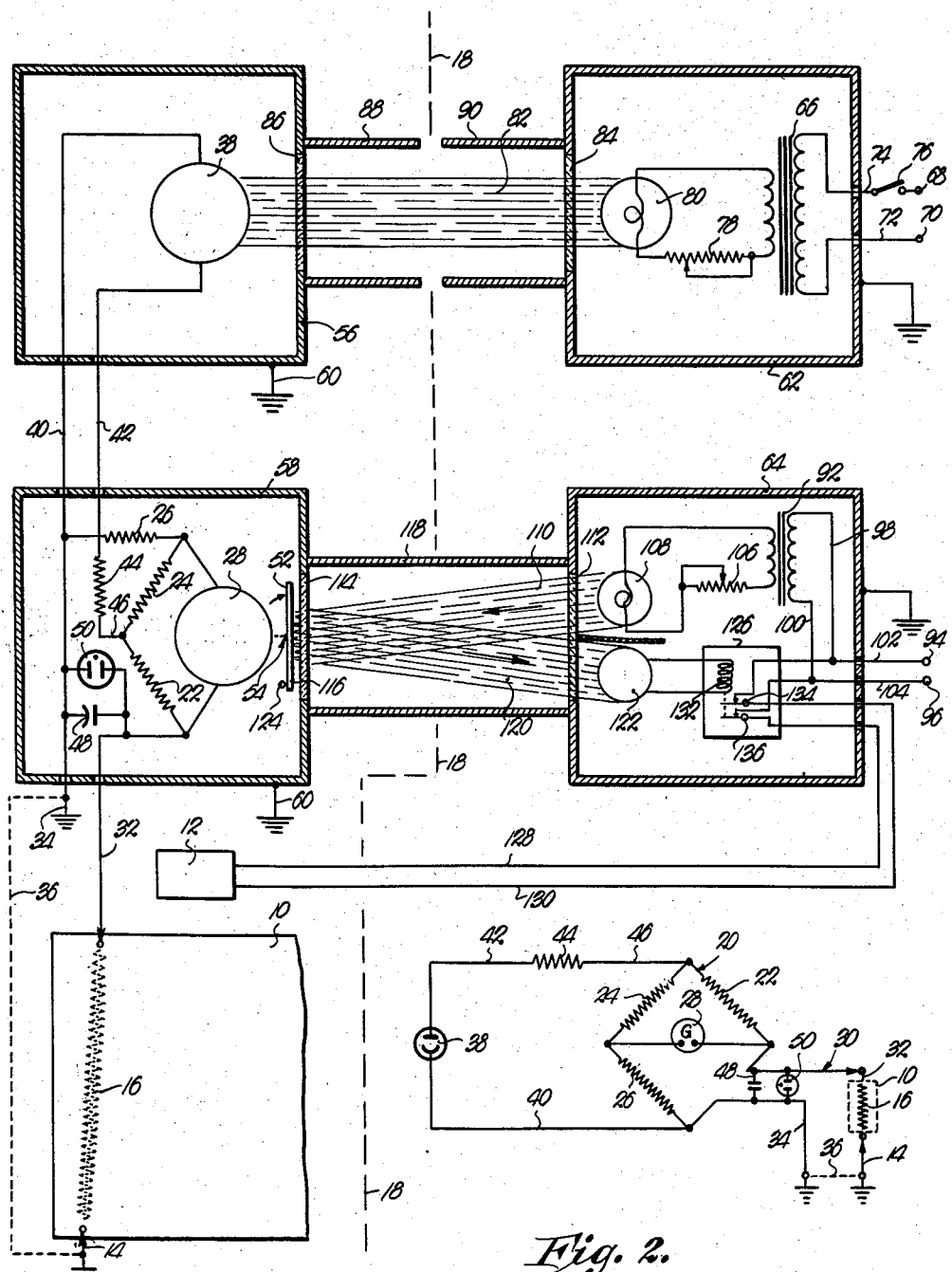
Fig. 1.
Fig. 2.
INVENTOR.
Raymond C. Webster
BY
ATTORNEY.

United States Patent Office 2,882,494
Patented Apr. 14, 1959

2,882,494

ELECTRICAL GROUND AND CONTINUITY CONTROL

Raymond C. Webster, Kansas City, Mo., assignor to W. E. Anderson, Inc., Kansas City, Mo.

Application February 23, 1954, Serial No. 412,017

4 Claims. (Cl. 324—62)

This invention relates to the field of electrical measurements and electrical controls and, more particularly, to apparatus for measuring the value of an unknown electrical impedance located in an area where every precludable possibility of sparks from the making or interrupting of electrical connections must be avoided and to apparatus for controlling an electrical circuit responsive to such a measurement.

It is, accordingly, the primary object of this invention to provide apparatus for use within an area where sparks must be avoided adapted for connection with an impedance of unknown value and for measuring the latter without making or breaking any connection within any circuit disposed in said area that is carrying, or will be caused to commence carrying, an electrical current capable of causing a spark or heating any conductor to an igniting temperature when the connection is made or broken, all of such circuits within said area being electrically isolated from any source of electrical power.

It is another of the principal objects of this invention to provide means including such impedance measuring apparatus for use in selectively controlling the ability of a power circuit within an area where sparks would be dangerous to be energized or de-energized, such control being responsive to the measured value of an impedance located within said area.

Other important objects of this invention will be made clear or become apparent as the following description of the invention progresses.

In the accompanying drawing:

Figure 1 is a largely schematic diagram of a preferred form of the apparatus contemplated by this invention, certain primarily known electronic components thereof being illustrated in cross section; and Fig. 2 is a schematic diagram of the impedance measuring portion of the circuitry included in this invention.

Although many uses and applications for the apparatus of this invention will become apparent to those skilled in the art, the same may conveniently be explained with particular reference to a use thereof in a gasoline bulk loading station where gasoline transport trucks are brought in empty condition for filling.

In Fig. 1, the numeral 10 generally designates a fragmentarily illustrated portion of the metal tank and body of a gasoline transport truck such as might be brought empty into a bulk loading station for filling with gasoline. The numeral 12 generally indicates a power or load circuit for equipment forming a part of the loading station and used in the pumping and delivery of gasoline to truck tank 10. Circuit 12 may obviously comprise either a power circuit for the actual pumping and loading equipment or could be a circuit breaking relay in the power circuit for such equipment or could even be some other sort of indicator or interlock for preventing or advising an operator against energization of a main power circuit for the operating equipment.

It is well-known that the loading of gasoline into an empty metal tank 10 may result in the production of a substantial charge of static electricity in tank 10 which, if the latter is not grounded, can result in a spark sufficient to ignite or cause an explosion of the gasoline and fumes therefrom. Accordingly, the tank 10 of gasoline trucks is normally grounded by a chain or the like and is also conventionally grounded through a specific connection 14 to tank 10 during preparation for loading at a bulk loading station. A resistance impedance 16 is illustrated in dotted lines in Fig. 1 and represents the ohmic resistance between tank 10 and ground. The preferred safety condition for loading of a tank 10 with gasoline is that resistance 16 shall be not more than some predetermined value such as 5 ohms. Where tank 10 is coupled with ground by means having resistance of 5 ohms or less, the static charges which would otherwise build up in tank 10 will leak off to ground through such low resistance path and the danger of sparking which might otherwise occur and ignite the gasoline is averted.

Since the general areas surrounding a gasoline bulk loading station, as well as a tank 10 which has been emptied of fluid gasoline, may at times be pervaded by gasoline fumes in sufficient concentration to support an explosion ignited from a spark, it is desirable not only that loading of a tank 10 be deferred until the requisite low value of resistance 16 has been determined, but also that the electrical circuits and means used for measuring the value of resistance 16 be adapted for coupling with the latter without sparking and for operation without the necessity of making or breaking any current-carrying circuits located within the danger area. The dash line 18 in Fig. 1 is intended to generally represent the boundary of such a danger area wherein elements disposed to the left of such line in the drawing may and normally will be disposed within the danger area and elements located to the right of such line in the drawing will preferably be located outside such area or within explosion proof containers if within said area.

Referring now to Fig. 2, there is illustrated schematically the electrical circuit of the measuring apparatus normally disposed within the danger area and used to determine the value of unknown impedance or resistance 16. Such measuring circuitry includes a Wheatstone type, measuring bridge circuit generally designated 20 and having a first resistance arm 22, a second resistance arm 24, and a third resistance arm 26 all of known value and connected in series; a metering assembly 28 in this invention preferably taking the form of a mirror indicating type galvanometer coupled between the free end of the first resistance arm 22 and the junction of resistance arms 24 and 26; and a fourth resistance arm generally designated 30 coupled between the free ends of arms 22 and 26 and constituting the unknown resistance 16, the ground connection 14 thereto, a connection 32 from the free end of arm 22 to truck 10, and a connection 34 from the free end of arm 26 to ground. It may be noted that in applications of this invention other than the one for measuring the resistance 16 from a gasoline truck tank 10 to ground it may be preferable to use a direct connection 36, illustrated in dotted lines, between the free end of arm 26 and unknown resistance or impedance 16, instead of the first-named connection including conductor 14, the ground and conductor 34.

A self-generating type photo-electric cell 38 is provided as a source of electrical power for operation of the bridge circuit 20. Cell 38 is coupled with the free end of arm 26 by conductor 40 and with the junction between arms 22 and 24 by conductor 42, a current limiting resistor 44 and a conductor 46. Coupled in parallel with each other and in series between the respective free ends of arm 22 and arm 26 are a capacitor 48 and a glow discharge tube 50, their function obviously being to guard against damage to bridge circuit 20 and particularly meter 28 thereof, as well as cell 38, from surges of current which might otherwise result from initial connection of conductor 32 to tank 10 if the latter had not been properly grounded and was carrying a charge of static electricity. It is believed that the manner in which bridge circuit 20 and its associated parts functions to measure the value of unknown resistance 16 will be clear to those skilled in the art and need not be here further discussed.

Referring again to Fig. 1, the numeral 52 indicates the mirror of galvanometer 28 which is rotatable around pivot point 54 in response to measurements of current flow made by the measuring portion of meter 28. Mirror 52 thus serves as a means of producing an observable indication of the reading made by meter 28.

Although the various parts of the measuring circuitry of this invention could be housed in various types of containers, there is shown for purposes of illustration a box 56 housing photo-electric cell 38 and a box 58 housing the bridge circuit 20 and its associated elements. Boxes 56 and 58 are preferably of the explosion-proof type and formed principally of metal which is grounded as at 60.

Illustrated as preferably disposed outside the danger area are similar boxes 62 and 64. Box 62 contains a source of light of substantially constant intensity comprising a transformer 66 adapted for connection to power terminals 68 and 70 through conductors 72 and 74 and control switch 76. Transformer 66 is preferably of the voltage regulating type in order to have a substantially constant output irrespective of minor voltage fluctuations in the power supplied to terminals 68 and 70. The output of transformer 66 is passed through an adjustable resistance element 78 to an electric light lamp 80. Rays of light 82 from lamp 80 are directed toward photoelectric cell 38 through a transparent window 84 in box 62 and a transparent window 86 in box 56. Boxes 56 and 62 may be provided with any suitable means 88 and 90 for confining the rays of light 82 which may impinge upon cell 38 to those emanating from lamp 80, such means 88 and 90 being shown in the drawing for purposes of illustration as elongated tubes extending from the windows 84 and 86 of boxes 62 and 56 respectively in alignment with the direction which rays of light 82 are to traverse.

Box 64 contains a second source of light comprising a transformer 92 coupled with power terminals 94 and 96 by conductors 98, 100, 102 and 104, which transformer 92 has its output connected through an adjustable resistance 106 with an electric light lamp 108. Rays of light 110 from lamp 108 are directed through a transparent window 112 in box 64 toward box 58 and through a transparent window 114 in the latter to impinge upon a reflecting surface 116 of mirror 52 of galvanometer 28. Rays 110 may be confined within a given beam and the imposition of other rays of light upon surface 116 prevented by any suitable shielding means 118, which may be similar in form to the separate shielding tubes 88 and 90 provided on boxes 56 and 62 or may, as illustrated, constitute a continuous tube 118 extending between boxes 58 and 64.

Rays of light 110 from lamp 108 will be reflected from surface 116 as at 120 and, when mirror 52 is rotated to a predetermined position, will pass back through window 112 of box 64 and be imposed upon a second photoelectric cell 122 within box 64. A stop 124 for mirror 52 is provided within box 58 and disposed to prevent rotation of mirror 52 past a predetermined position corresponding to a predetermined reading for the value of the unknown impedance 16. For the purposes of the apparatus being described for use in connection with a gasoline loading station, mirror 52 may be assumed to rotate in the direction of the arrow appearing adjacent thereto in Fig. 1 as the magnitude of the resistance measurement decreases, with stop 124 being disposed to engage mirror 52 when the reading is 5 ohms and to prevent further rotation of mirror 52 where the measuring resistance is less than 5 ohms.

Photo-electric cell 122 has its output connected with electrical switching means 126 of any nature suitable for completing a circuit from power terminals 94 and 96 through conductors 102, 104, 128 and 130 to operating or load circuit 12. Such switching means 126 may be electronic in nature, or as illustrated, may utilize a relay having a coil 132 coupled with cell 122 and a pair of associated, normally open switches 134 and 136 respectively disposed in series between conductors 102—130 and 104—128.

In operation, when a truck having a tank 10 is brought into the loading station for filling, an operator first attaches grounding connection 14 to tank 10 and then attaches metering connection 32 to another point on tank 10, connection 34 between the measuring circuit 20 and the ground being preferably continuously maintained. Switch 76 may thereupon be closed to energize lamp 80 which will transmit rays of light 82 to photo-electric cell 38, the latter thereupon generating the electrical power necessary for operation of bridge circuit 20 in measuring the value of unknown resistance 16. In accordance with the measured value of resistance 16 indicating mirror 52 of galvanometer 28 will turn to a position where rays of light from lamp 108 are reflected back to impinge upon photo-electric cell 122. When so radiated, cell 122 generates electrical power which energizes coil 132, thereby closing switches 134 and 136 to complete the power circuit from terminals 94 and 96 to the load circuit 12. Thus, the desired measurement of the resistance value of unknown resistance 16 has been accomplished without making or breaking any connection in a circuit in which electrical current capable of causing a spark or of heating any conductor to an igniting temperature is flowing at the time, and the energization of load circuit 12 has been automatically accomplished responsive to the measurement made upon unknown resistance 16, but only if the measured value of such resistance 16 was found to be within the range required for safety.

It will now be apparent that the apparatus contemplated by this invention presents means uniquely adapted for achieving the above stated objectives with equipment of optimum simplicity consistent with the consideration of safety and accuracy involved. Obviously, the apparatus may be adapted for the measurement of electrical voltages, currents and other quantities reducible to an electrical voltage, current or impedance, as well as the impedance measurement illustrated above. Manifestly, certain other minor changes or modifications might be made by those skilled in the art without departing from the true spirit and intention of this invention. Accordingly, it is desired to be limited only by the scope of the appended claims.

Having thus described the invention, what is claimed as new and desired to be secured by Letters Patent is:

1. Apparatus for measuring the value of an unknown resistance located in an area where every precludable possibility of sparks from the making or interrupting of electrical connections must be avoided, said apparatus comprising a Wheatstone type, resistance measuring bridge adapted to be disposed within said area and provided with three series-connected arms of predetermined, fixed resistance values and an electrical metering assembly connected in series between the free end of a first of said arms and the junction between the second and third of said arms; electrically conductive means for making electrical connection within said area of said resistance whose value is to be measured in series between the free ends of said first and third arms and for interrupting said last-mentioned connection when the measurement has been completed; a capacitor; a gaseous discharge tube; electrically conductive means coupling said capacitor and said discharge tube in parallel with each other and with said means for making connection of the resistance whose value is to be measured with the free ends of said first and third arms; a self-generating, photo-electric cell adapted to be disposed within said area; electrically conductive means coupling said cell in series between said free end of the third arm and the junction between the first and second arms; and means, including an electrical circuit adapted for connection with a source of electrical power of predetermined magnitude and having an electric lamp therein physically disposed at a predetermined distance from said device, for alternately imposing or preventing the imposition of rays of light of predetermined intensity upon said cell.

2. Electrical apparatus for selectively energizing and de-energizing an electrical power circuit located in part in an area where every precludable possibility of sparks from the making or interrupting of electrical connections must be avoided, in response to a measurement of the value of an unknown electrical impedance located in said area and to which connection must also be made prior to said measurement, said apparatus comprising an electrical measuring circuit adapted to be disposed within said area and requiring electrical power for operation, said measuring circuit including a meter assembly having a movable indicating mirror; means for making electrical connection within said area between the measuring circuit and the impedance whose value is to be measured; a photo-electric device adapted to be disposed within said area and adapted for generating electrical power when rays of light are imposed thereon; means coupling said device with the measuring circuit; means for imposing rays of light of predetermined intensity upon said device after said impedance has been connected with the measuring circuit and for preventing the imposition of rays of light upon said device until the connection between the impedance and the measuring circuit is made; means for imposing rays of light upon said indicating mirror of the meter assembly; a second photo-electric device positioned for incidence thereon of rays of light reflected from said mirror when the latter has moved to a predetermined position; and a normally open circuit-breaking mechanism adapted for connection in series with said power circuit for making and breaking the latter, said mechanism being coupled with said second photo-electric device and responsive to current generated by the latter when rays of light are imposed thereon for operating the mechanism to close said power circuit.

3. In the apparatus as set forth in claim 3, wherein said meter assembly includes stop means for preventing movement of said mirror beyond said predetermined position.

4. Apparatus for preventing energization of the power circuit of electrical equipment for loading an inflammable material into the tank of a vehicle unless said tank is connected with ground through conductive means presenting a resistance between said tank and ground of less than a predetermined magnitude, said apparatus comprising means for connecting said tank to ground; a Wheatstone type, resistance measuring, bridge circuit having three arms of fixed, predetermined resistance and provided with a balance indicating, mirror galvanometer having a rotatable reflecting surface; a photo-electric cell coupled with said bridge circuit and with ground; means for connecting said tank with said bridge circuit; means for controllably imposing rays of light of predetermined intensity on said photo-electric cell; a source of light rays directed toward said surface; a second photo-electric cell disposed to receive rays of light reflected by said surface when the mirror has moved to a predetermined position; a relay having an operating coil and a normally open switch controlled by said coil and connected in series with said power circuit; and means coupling said second photo-electric cell with said coil for energization of the latter to close said switch when the mirror moves to said predetermined position.

References Cited in the file of this patent
UNITED STATES PATENTS

| | | |
|---|---|---|
| 1,257,440 | Zehden | Feb. 26, 1918 |
| 1,813,778 | Strauss | July 7, 1931 |
| 1,822,075 | Aronoff | Sept. 8, 1931 |
| 2,287,808 | Lehde | June 30, 1942 |
| 2,444,014 | Williams | June 22, 1948 |
| 2,471,001 | Miller | May 24, 1949 |
| 2,611,862 | Riddle et al. | Sept. 23, 1952 |
| 2,707,770 | Clardy | May 3, 1955 |

FOREIGN PATENTS

| | | |
|---|---|---|
| 250,410 | Switzerland | June 16, 1948 |